US012775812B2

(12) United States Patent
McClellan

(10) Patent No.: US 12,775,812 B2
(45) Date of Patent: Oct. 27, 2026

(54) SYSTEMS AND METHODS FOR TRACKING GAMING CHIPS

(71) Applicant: Tavolo LLC, Grosse Pointe, MI (US)

(72) Inventor: Ryan Patrick McClellan, Grosse Pointe, MI (US)

(73) Assignee: Tavolo LLC, Grosse Pointe, MI (US)

(*) Notice: Subject to any disclaimer, the term of this patent is extended or adjusted under 35 U.S.C. 154(b) by 0 days.

(21) Appl. No.: 19/176,564

(22) Filed: Apr. 11, 2025

(65) Prior Publication Data

US 2025/0238643 A1 Jul. 24, 2025

Related U.S. Application Data

(63) Continuation of application No. 18/621,416, filed on Mar. 29, 2024, now Pat. No. 12,299,526.

(60) Provisional application No. 63/493,567, filed on Mar. 31, 2023.

(51) Int. Cl.
*G06K 7/10* (2006.01)
*G07F 17/32* (2006.01)

(52) U.S. Cl.
CPC ..... *G06K 7/10475* (2013.01); *G07F 17/3241* (2013.01); *G07F 17/3248* (2013.01)

(58) Field of Classification Search
CPC ............ G06K 7/10475; G07F 17/3241; G07F 17/3248; G07F 17/322; G07F 17/3223; G07F 17/3239
See application file for complete search history.

(56) References Cited

U.S. PATENT DOCUMENTS

| | | | | |
|---|---|---|---|---|
| 7,038,573 B2 * | 5/2006 | Bann | ..................... | B66F 9/0755 340/10.52 |
| 7,920,046 B1 | 4/2011 | Aiouaz | | |
| 7,938,722 B2 * | 5/2011 | Rowe | .................. | G07F 17/3251 463/43 |
| 8,339,243 B2 * | 12/2012 | Shiau | .................. | G06K 7/0008 340/10.3 |
| 11,630,964 B1 | 4/2023 | Seitz | | |

(Continued)

FOREIGN PATENT DOCUMENTS

| | | |
|---|---|---|
| CA | 3026358 A1 | 6/2019 |
| CA | 3135013 A1 | 4/2022 |

(Continued)

OTHER PUBLICATIONS

Kr 20090097577A—Compact Broadband RFID Tag Antenna, 27 pages. (Year: 2026).*

*Primary Examiner* — Tuyen K Vo
(74) *Attorney, Agent, or Firm* — The Dobrusin Law Firm, P.C.

(57) ABSTRACT

A system includes a plurality of anchors fixed in a casino, the anchors configured to transmit and receive ultra-wideband (UWB) signals, a plurality of tags configured to transmit and receive UWB signals data, data processing hardware, and memory hardware in communication with the data processing hardware. The memory hardware stores instructions that when executed by the data processing hardware cause the data processing hardware to perform operations that include tracking the location of the tags via transmission and receipt of UWB signals between the anchors and the tags, and instructing tags at rest to function as anchors to transmit and receive UWB signals with tags in motion.

19 Claims, 13 Drawing Sheets

(56) References Cited

U.S. PATENT DOCUMENTS

| | | | | |
|---|---|---|---|---|
| 2006/0267731 | A1 | 11/2006 | Chen | |
| 2007/0060311 | A1 | 3/2007 | Rowe | |
| 2009/0253498 | A1* | 10/2009 | Wolf | G07F 17/32 463/29 |
| 2010/0093429 | A1* | 4/2010 | Mattice | G07F 17/3232 463/25 |
| 2010/0277280 | A1 | 11/2010 | Burkart | |
| 2011/0032101 | A1 | 2/2011 | Hecht | |
| 2011/0047015 | A1 | 2/2011 | Twitchell | |
| 2011/0089634 | A1 | 4/2011 | Thorson | |
| 2011/0227703 | A1* | 9/2011 | Kotab | G07F 17/3202 340/10.1 |
| 2019/0035224 | A1 | 1/2019 | Okahara | |
| 2021/0074117 | A1* | 3/2021 | Danielson | G07F 17/3223 |
| 2022/0261562 | A1 | 8/2022 | Gudi | |

FOREIGN PATENT DOCUMENTS

| | | | | |
|---|---|---|---|---|
| KR | 20230117662 | A | 8/2023 | |
| WO | WO-2016187164 | A1 * | 11/2016 | A63F 1/067 |
| WO | 2023/249919 | A1 | 12/2023 | |

* cited by examiner

SYSTEMS AND METHODS FOR TRACKING GAMING CHIPS

CROSS REFERENCE TO RELATED APPLICATIONS

This U.S. patent application claims priority under 35 U.S.C. § 119 (e) to U.S. Provisional Application No. 63/493,567, filed on Mar. 31, 2023. The disclosure of this prior application is considered part of the disclosure of this application and is hereby incorporated by reference in its entirety.

TECHNICAL FIELD

This disclosure relates to systems and methods for tracking gaming chips.

BACKGROUND

Casino games have wagering chips that are required to play the game. The chips are purchased either at a casino table or at a casino cage. These chips are of varying denominations and are placed in betting positions on the casino table. It may be advantageous for casinos to track these chips to determine how much players are wagering, determine the profitability of the table at any given time, reduce losses from stolen chips, etc. Current basic methods for tracking include a person physically watching the wagering take place via cameras in the casino, but such basic methods are inconsistent, arduous, and burdensome. Additionally, it is very difficult for a human to monitor all of the activities that take place at a single gaming table, let alone an entire casino. Thus, the risk of players stealing gaming chips or engaging in other unwanted activity is high.

Existing systems that utilize cameras and/or RFID systems suffer from many drawbacks, such as the inability to associate bets to a specific player, inaccuracies in tracking the movement of chips, and only operating in a limited space in the casino. Accordingly, there are opportunities in the art for improved and more accurate tracking of gaming chips in a casino.

SUMMARY

One aspect of the disclosure provides a system comprising a plurality of anchors fixed in a casino, the anchors configured to transmit and receive ultra-wideband (UWB) signals, a plurality of tags configured to transmit and receive UWB signals, data processing hardware, and memory hardware in communication with the data processing hardware, the memory hardware storing instructions that when executed on the data processing hardware cause the data processing hardware to perform operations comprising tracking the location of the tags via transmission and receipt of UWB signals between the anchors and the tags, and instructing tags at rest to function as anchors to transmit and receive UWB signals with tags in motion.

Implementations of the disclosure may include one or more of the following optional features. In some implementations, the operations further comprise instructing the tags to transmit UWB signals at a low frequency when at rest and a high frequency when in motion.

The tags may each include a magnetometer for detecting magnetic fields. The operations may further comprise obtaining data from the magnetometer to determine whether one of the tags is directly contacting another one of the tags.

The operations may further comprise defining a plurality of regions on a casino table. The operations may further comprise assigning different UWB frequencies to each of the plurality of regions. The operations may further comprise when the data processing hardware detects that one of the tags is located in one of the regions, instructing the located tag to transmit UWB pulses at the UWB frequency assigned to that region. One of the regions may be a wagering region. The wagering region may be assigned a higher UWB frequency than any of the other regions.

Another aspect of the disclosure provides a system comprising a plurality of anchors fixed in a casino, the anchors configured to transmit and receive ultra-wideband (UWB) signals, a mobile anchor configured to transmit and receive UWB signals, a plurality of tags configured to transmit and receive UWB signals with the plurality of anchors and the mobile anchor, data processing hardware, and memory hardware in communication with the data processing hardware, the memory hardware storing instructions that when executed on the data processing hardware cause the data processing hardware to perform operations comprising tracking the location of the tags via transmission and receipt of UWB signals between the anchors and the tags, and instructing tags at rest to function as anchors to transmit and receive UWB signals with tags in motion.

Implementations of the disclosure may include one or more of the following optional features. In some implementations, the tags include near-field communication (NFC) capabilities.

The tags may include an accelerometer. The operations may further comprise obtaining data from the accelerometers to determine whether the tags are at rest or in motion.

The tags may include a lighting indicator. The operations may further comprise instructing the lighting indicator to turn on when the data processing hardware determines that the tag is not in a proper location.

Another aspect of the disclosure provides system comprising a plurality of anchors fixed in a casino, the anchors configured to transmit and receive ultra-wideband (UWB) signals, a plurality of tags configured to transmit and receive UWB signals with the plurality of anchors, the tags including charging coils to facilitate induction charging in a tray, data processing hardware, and memory hardware in communication with the data processing hardware, the memory hardware storing instructions that when executed on the data processing hardware cause the data processing hardware to perform operations comprising tracking the location of the tags via transmission and receipt of UWB signals between the anchors and the tags, and instructing tags at rest to function as anchors to transmit and receive UWB signals with tags in motion.

Implementations of the disclosure may include one or more of the following optional features. In some implementations, the tags include terminals for charging in a tray.

The tags may be incorporated into casino gaming chips.

The tags may be incorporated into electronic cards.

The anchors are incorporated into one of walls, ceiling, floor, or furniture of a casino.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The systems and methods described herein use ultra-wideband (UWB) technology, which is a radio technology based on the Institute of Electrical and Electronics Engineers (IEEE) 802.15.4a and 802.15.4z standards that can enable accurate measure of the time of flight of a radio signal, leading to centimeter accuracy distance/location measurement. Additionally, UWB offers data communication while using very little energy, resulting in longer battery life than many other alternative communication systems.

Figure 1:
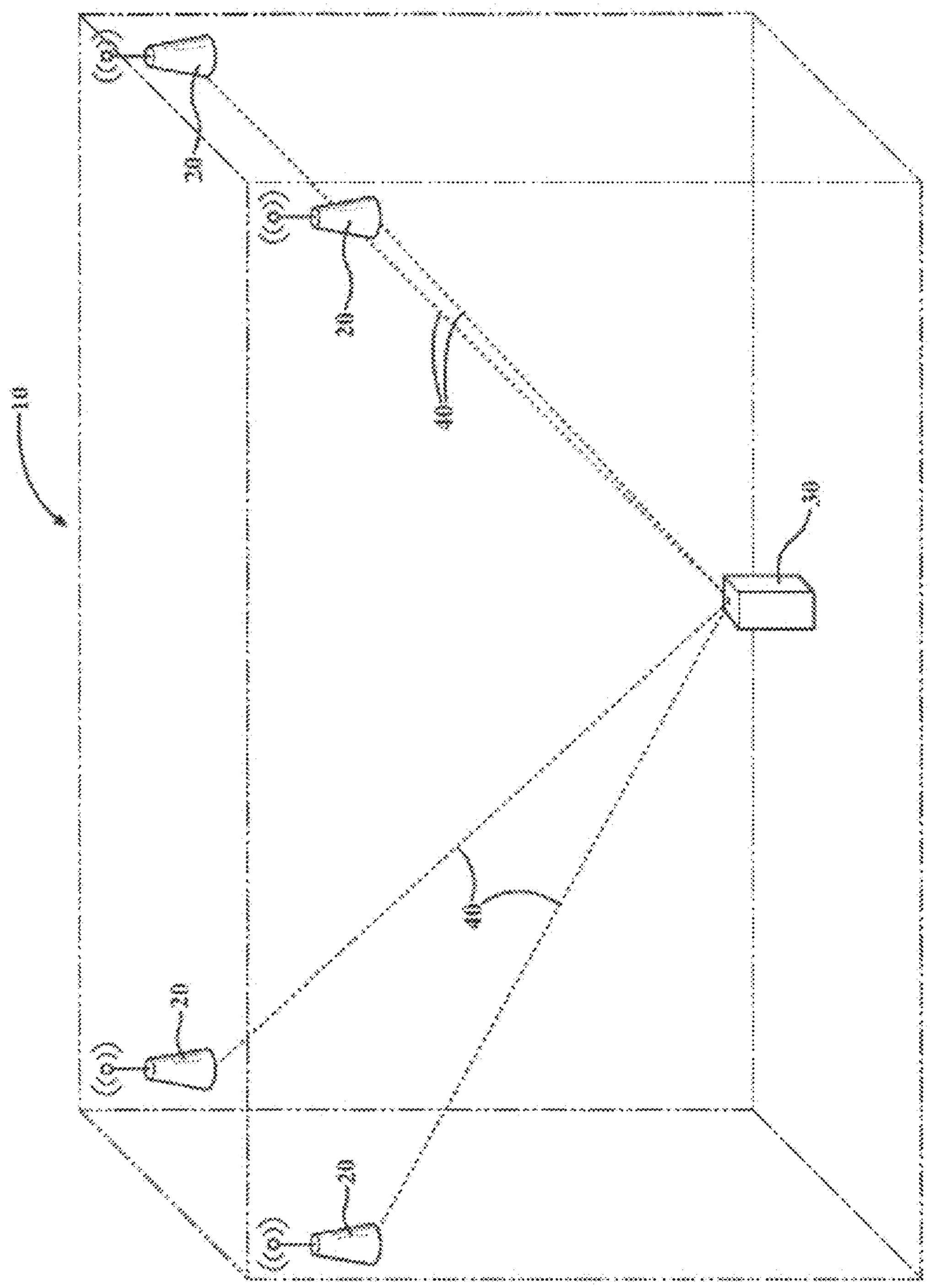
FIG. 1 is a schematic view of an exemplary ultra-wideband (UWB) tracking system, as described herein.

An exemplary UWB system 10 is shown schematically in FIG. 1, which illustrates a plurality of anchors 20 and a tag 30. UWB uses radio waves 40 to determine location. As shown in FIG. 1, the UWB system 10 may triangulate the location of the tag 30 based on the communication between the anchors 20 and the tag 30 via the radio waves 40, with data processing hardware of the UWB system 10 determining XYZ coordinates of the tag 30 based on the received location data. The UWB system 10 may determine the location of the tag 30 using at least one of the following methods: time different of arrival (TDOA), reverse TDOA, two-way ranging (TWR), and phase difference of arrival (PDOA).

The TDOA method is a scalable method for determining the location of tags within a venue. Because tags only need to transmit once during the process, they use very little power and therefore have a very long battery life. Multiple anchors are deployed in fixed and known locations and are tightly time-synchronized. When a tag sends a "beacon" or "blink" signal, each anchor that receives the signal time-stamps its arrival, based on the common synchronized time-base. The timestamps from multiple anchors are then forwarded to data processing hardware, which runs multi-lateration algorithms to determine the tag's location based on the differences in the time that the signal arrived at each anchor. When there are three or more anchors, the result is a 3-dimensional (3D) position for the tag based on XYZ coordinates.

The reverse TDOA method operates similarly to GPS. In reverse TDOA, the anchors transmit synchronized blinks (with fixed/known offsets to avoid collisions) and the tags use TDOA and multilateration algorithms to compute the location of the tags.

In the TWR method, anchors send UWB signals to the tags, which, in turn, return the signal back to the anchors, creating a two-way data transfer of ranging information. The data processing hardware measures the time of flight of the signal between each anchor and the tag to derive the distance between each anchor and the tag, thereby, determining a precise location of the tag relative to the anchors.

The PDOA method enables two devices to calculate their relative positions without the need for any other infrastructure, using a combination of distance and directional information. This may be beneficial for peer-to-peer applications or to reduce the amount of infrastructure that needs to be deployed. For PDOA, one of the devices must carry at least two antennae. When the first device receives a signal from the second device, it measures the difference in the phase of the arriving signal at each antenna. Based on this information, the first device can calculate the angle from which the incoming signal arrived. The first, receiving device thus is able to determine both the direction and the distance of the second, transmitting device.

Figure 2:
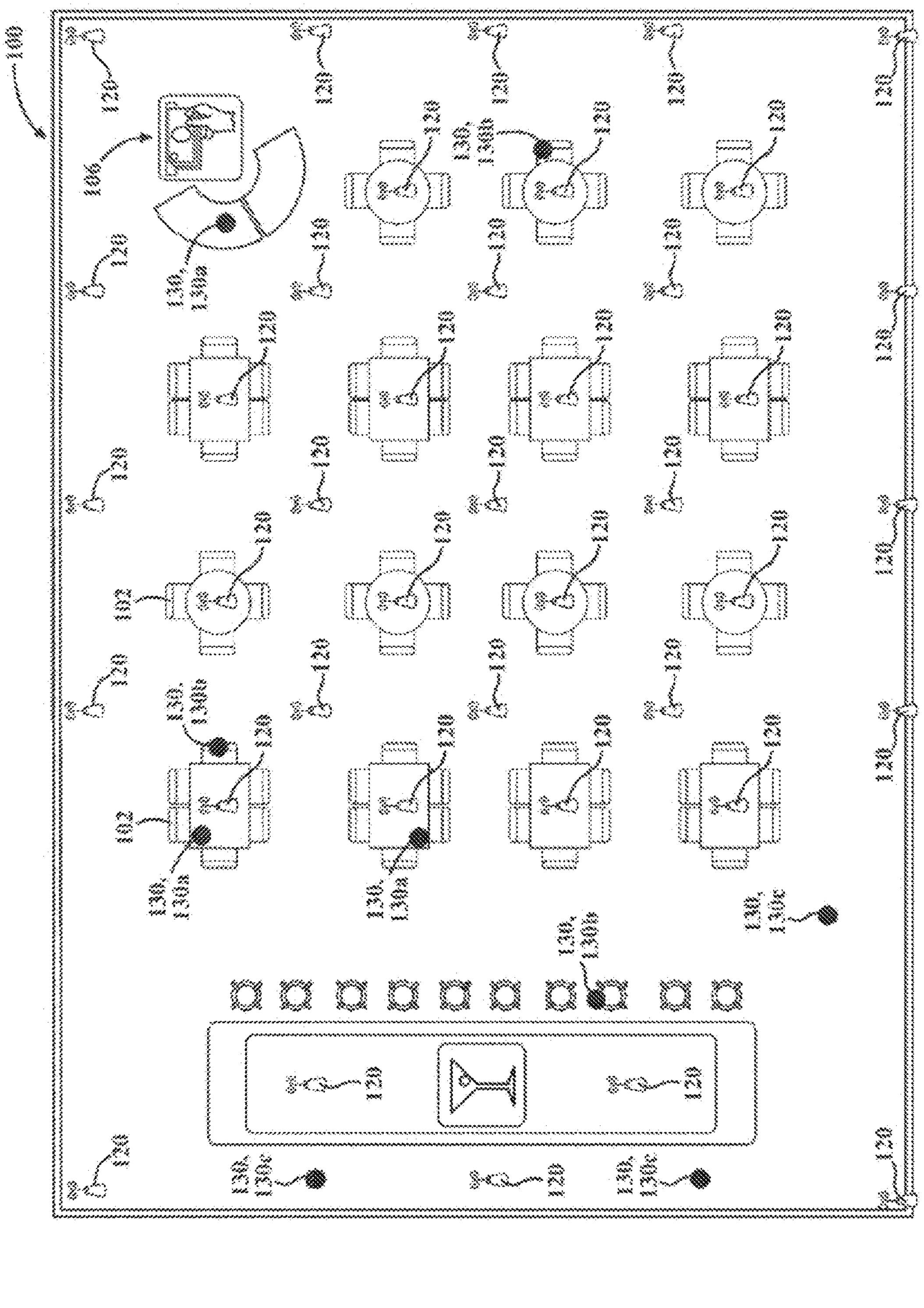
FIG. 2 is a schematic view of an exemplary casino tracking system using ultra-wideband (UWB) technology, as described herein.

Referring to FIG. 2, an exemplary schematic of a casino tracking system 100 is generally shown in plan view. The casino of the casino tracking system 100 may include a plurality of gaming tables 102, a bar area 104, and a cashier or cage 106. The casino tracking system 100 may include a plurality of anchors 120, similar to the anchors 20 described above, that, in conjunction with data processing hardware, are capable of performing tracking operations using at least one of the following methods: time different of arrival (TDOA), reverse TDOA, two-way ranging (TWR), and phase difference of arrival (PDOA). FIG. 2 is presented for illustration purposes only, and it should be understood that the anchors 120 may be disposed in a variety of locations. For example, the anchors 120 may be disposed in the ceiling, in the floor, in or on the walls, in a gaming table, on a gaming table, under a gaming table, in a chair, in the bar area 104, in the cage 106, etc.

The anchors 120 may track a plurality of tags 130. The tags 130 may include electronic circuitry that enable UWB communication with the anchors 120, as described in greater detail below. The tags 130 may be housed in a variety of different forms, such as gaming chips, employee cards, cocktail trays, etc. For example, as shown in FIG. 2, the tags 130 include gaming chips 130*a*, dealer employee cards 130*b*, and server employee cards 130*c*. Each of the tags 130 is assigned a unique identifier and associated with its respective owner. For example, employee card tags 130*b*, 130*c* may each be assigned a unique identifier that is associated with an employee profile corresponding to that individual employee.

Gaming chip tags 130*a* may be associated to a specific player when the player receives the chips at the table 102 or at the cage 106. For example, if the player has a player or loyalty card evidencing a player profile, then the gaming chips 130*a* given to the player at the table 102 or cage 106 may be assigned a unique identifier that is associated with that player's profile when the player presents their player card or the dealer or employee at the cage 106 looks up the player's profile. As another example, face recognition technology using cameras throughout the casino, including at the table 102 and at the cage 106, may automatically associate the gaming chips 130*a* to the specific player's facial recognition profile. Such association may utilize artificial intelligence or machine learning, including supervised machine learning, whereby a human operator verifies the automatic association of the player with a specific player profile. In instances where a player does not have a player profile, the casino tracking system 100 may automatically create a profile for the player based on the player's identification (e.g., driver's license) presented when receiving the gaming chips 130*a* at the table 102 or cage 106. In instances where identification is not provided, the casino tracking system 100 may use the player's facial recognition profile as a temporary association. For instance, a player who elects to not be rated may purchase gaming chips at the table. The camera systems determine the new player's face using facial recognition and create a facial recognition profile for the player. The software generates an image of the player. The dealer, supervisor, or someone from surveillance may then, using a screen at the table or in another location, associate the buy-in of gaming chips to the face shown on the screen. Thereafter, transactions are associated to this unique, unknown individual.

By being associated with specific individuals, the casino tracking system 100 can monitor the tags 130 and isolate different types of tags 130. For example, the casino tracking system 100 may isolate the gaming chips 130*a* to determine areas of the casino where large amounts of money are in play or areas/games that do not have a lot of money in play. The ability to track an individual's wagering may be beneficial for the casino to understand that individual's player value, which can result in the casino taking action to nurture the relationship with that individual, e.g., giving complimentary items and services, incentives, etc. This information may also be beneficial for the casino's overall profitability and other tax considerations.

As another example, the casino tracking system 100 may isolate the dealer employee tags 130*b* to ensure that the dealers are located at the desired tables and games. As yet another example, the casino tracking system 100 may isolate the server tags 130*c* to ensure that the servers are in the desired locations. All of this information may be used to gather information such as hotspots, traffic patterns, time in zones, or rounds accomplished.

In operation, a user may select (e.g., via a computing device) a specific tag 130 and the casino tracking system 100 may display the information related to the individual associated with the selected tag 130 on any suitable display (e.g., smartphone, computer, laptop, tablet computer, etc.). Such information may include name, time entered into the casino, amount of chips received at the table 102 or cage 106, room number, creation date, denomination, chip type, casino name, etc.

Figure 3:
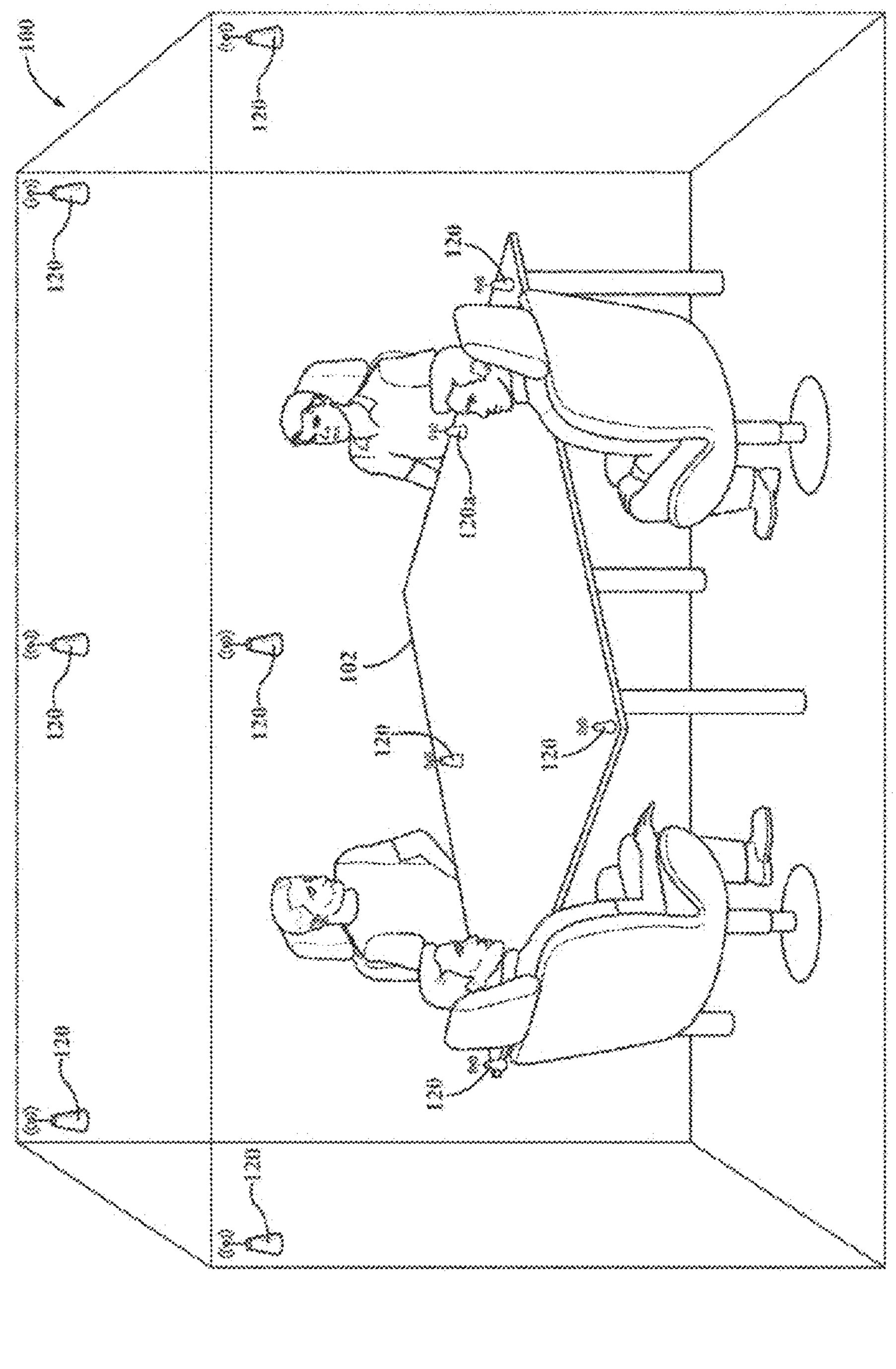
FIG. 3 is a schematic view of an exemplary table of the casino tracking system of FIG. 2.

Referring to FIG. 3, an exemplary schematic of the casino tracking system 100 is generally shown, with particular reference to an exemplary gaming table 102. In some implementations, there may be a higher concentration of anchors 120 in a specific area. For example, as shown in FIG. 3, there may be six anchors 120 in the ceiling in close proximity to the table 102 and an additional four anchors 120 in, on, or under the table 102. The higher concentration of anchors 120 may be used for location precision where needed and redundancy. Redundancy may be used if one anchor 120 experiences difficulty locating a tag 130 or tags 130 due to interference, faulty hardware, or other failures.

Networking in casinos generally includes numerous networks due to gaming regulations. Table game data may be required to be managed and maintained on a completely different network from the general casino data. There may also be communication between the two systems when necessary. In some implementations, such as the exemplary implementation shown in FIG. 3, the four anchors 120 on the table 102 may be networked together via a hardwired network. The anchor(s) 120 in or on the ceiling may be utilized constantly or when requested. It is possible that the ceiling anchor(s) 120 are wired physically to a backend server while also maintaining a local wireless connection to the intranet located at the table 102. It is also possible that the ceiling anchor(s) 120 communicates with a table processor or computer via a wireless connection.

Figure 4A:
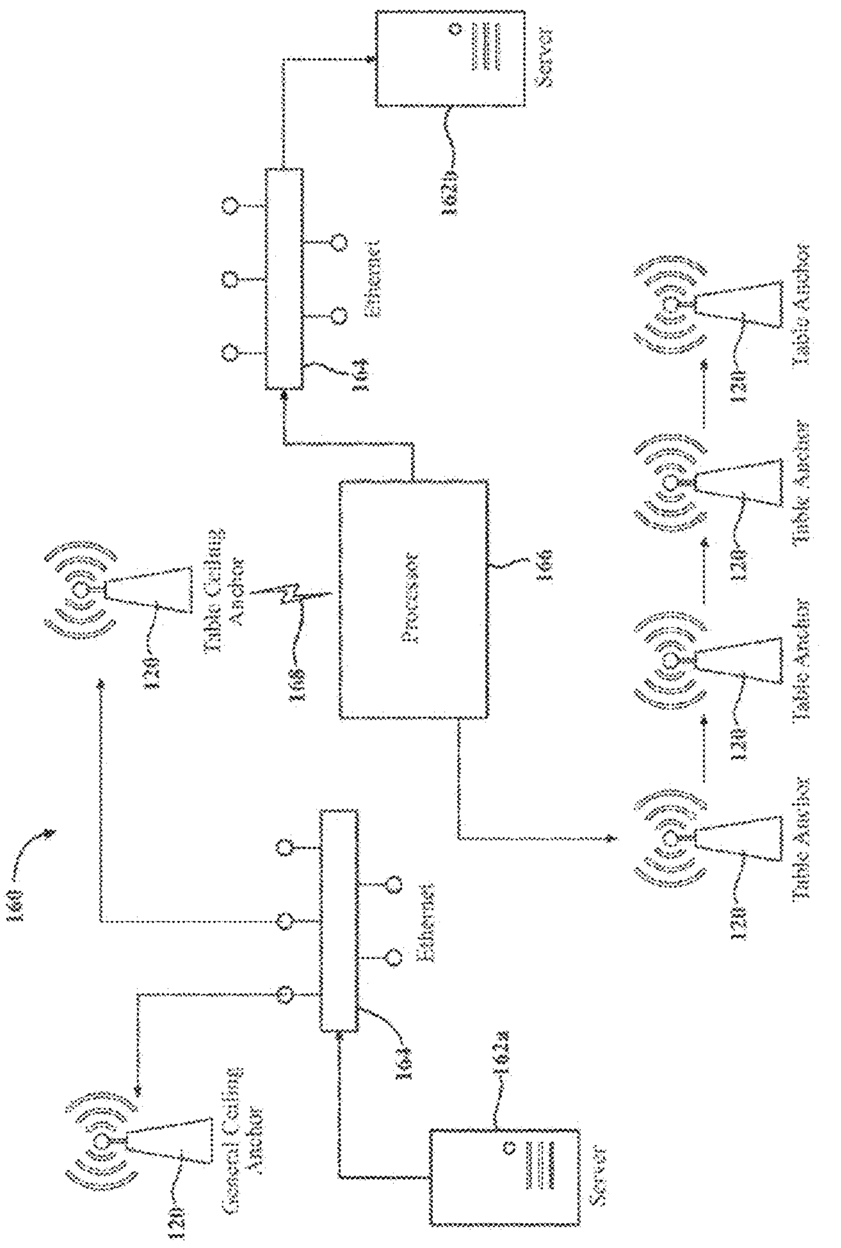
FIG. 4A is a schematic view of a first exemplary network of the casino tracking system of FIG. 2.

Referring to FIG. 4A, an exemplary network 160 for a portion of the casino tracking system 100 is generally shown. In this embodiment, a processor 166 (e.g., microprocessor, single board computer, printed circuit board, application-specific integrated circuit, etc.) at the table 102 acts as a gateway to manage the data for the four table anchors 120 and has a wireless connection 168 to the ceiling anchor 120. The wireless connection 168 may be UWB, WiFi, Bluetooth, cellular, LORA, or Sub-GHz, etc. In some implementations, this may be a closed network with a 1:1 connection. In other implementations, there may be another processor that obtains the location data from the anchors 120 and manages the anchors' 120 location information for post-processing.

In some implementations, the anchors 120 may connect directly with the tags 130 via Bluetooth to transmit data between the anchors 120 and tags 130. For example, the anchors 120 may detect a tag 130 via TDOA using time sync and data sharing between the anchors 120. The casino tracking system 100 may determine if the distance between one of the anchors 120 and the tag 130 is sufficient to establish a Bluetooth connection between the particular anchor 120 and the tag 130. If the distance is sufficient, then the casino tracking system 100 may instruct the anchor 120 to connect directly with the tag 130 via Bluetooth and use TWR to transmit ranging information between the anchor 120 and the tag 130 to determine the location of the tag 130.

To comply with gaming regulations, the data accumulated at the gaming table 102 may be managed on a different server from that of the general server for dealers, servers, etc. For example, a first server 162*a* may obtain, manage, and store the data from the general ceiling anchor 120 and the table ceiling anchor 120 via a hardwired connection 164 (e.g., Ethernet), and a second server 162*b* may obtain, manage, and store the location data from the processor 166 that was obtained from the four table anchors 120 via a hardwired connection 164 (e.g., Ethernet).

Figure 4B:
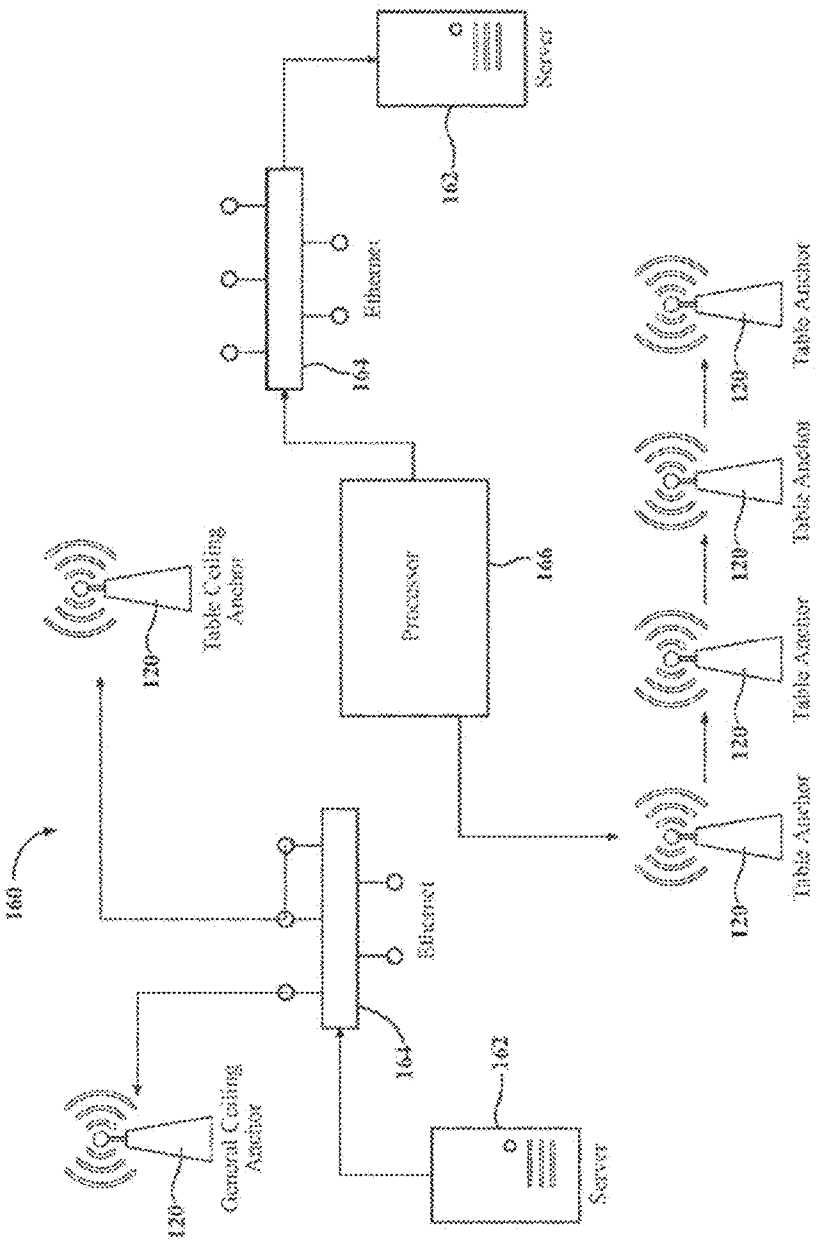
FIG. 4B is a schematic view of a second exemplary network of the casino tracking system of FIG. 2.

Referring to FIG. 4B, another exemplary network 160 for a portion of the casino tracking system 100 is generally shown. In this embodiment, the ceiling anchor 120 may have a dual wired network connection 164 and can manage requests from both networks 164. In the embodiments shown here, each anchor 120 is shown to have a dual network connection 164. In some implementations, the table anchors 120 only have one network connection and are connected to the processor 166 at the table 102 via independent network connections. It should be understood that the ceiling anchor 120 is an upper anchor; it may or may not be on the ceiling as it may be installed in the table limit sign, or on other signage on the table 102. There may also be two elevated anchors 120 for improved accuracy.

Figure 5:
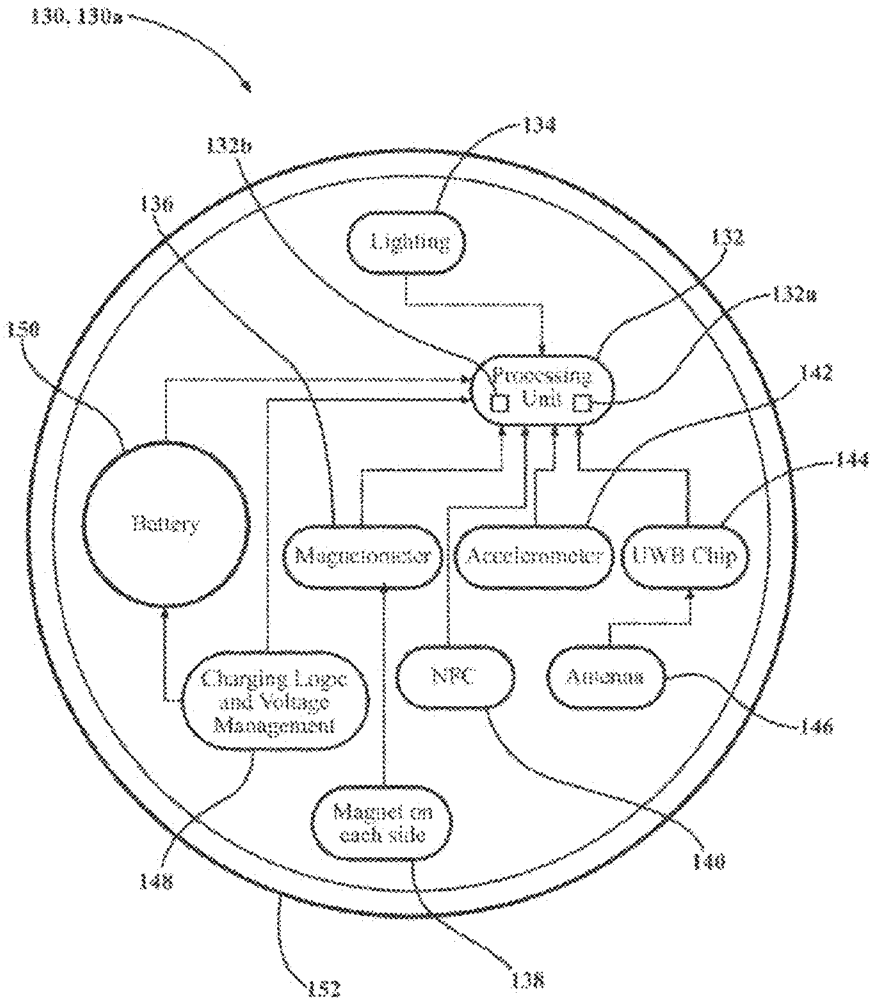
FIG. 5 is a schematic view of an exemplary gaming chip tag of the casino tracking system of FIG. 2.

Referring to FIG. 5, an exemplary schematic of the gaming chip tag 130, 130*a* is generally shown. The gaming chip tag 130*a* may be housed in a plastic housing 152 that generally resembles a traditional gaming chip, i.e., a thin disk. In some implementations, the gaming chip housing 152 may be 39 mm×3.38 mm. In other implementations, the gaming chip housing may be rectangular, triangular, or any other suitable size and shape. The gaming chip tag 130*a* may include a processing unit 132 comprising data processing hardware 132*a* (a computing device that executes instructions) and memory hardware 132*b*. The processing unit 132 may be in communication with the following modules/components of the gaming chip tag 130*a*: a lighting module 134, a magnetometer 136 connected to magnets 138 on the gaming chip, a near-field communication (NFC) module 140, an accelerometer and/or gyroscope 142, a UWB module 144 connected to one or more antennae 146, a charging logic module 148, and a rechargeable battery 150. The other tags 130, such as the dealer tags 130*b* and the server tags 130*c*, may have generally the same components as the gaming chip tags 130*c* described herein, but they may be housed in a different housing (e.g., an employee card, a cocktail tray, etc.).

The processing unit 132 is configured to perform power management via the charging logic and voltage management module 148 to determine when to charge the battery 150.

The processing unit 132 is configured to perform accelerometer management via the accelerometer 142 to monitor the data from the accelerometer 142 to determine whether to trigger the UWB pulse frequency/type. That is, in order to conserve processing resources and power, the processing unit 132 may be configured to decrease the frequency/rate at which the gaming chip tag 130*a* transmits UWB pulses (via the UWB chip 144) when the processing unit 132 determines (via the accelerometer 142) that the gaming chip tag 130*a* is at rest. Because the gaming chip tag 130*a* is at rest, the casino tracking system 100 determines that the gaming chip tag 130*a* is still at the last known location, and it can either reduce the frequency with which it tracks the gaming chip tag 130*a* or temporarily suspend tracking the gaming chip tag 130*a* until motion is detected via the accelerometer 142.

Conversely, the processing unit 132 may be configured to increase the frequency/rate at which the gaming chip tag 130*a* transmits UWB pulses (via the UWB chip 144) when the processing unit 132 determines (via the accelerometer 142) that the gaming chip tag 130*a* is in motion. This ensures that the gaming chip tag 130*a* is being tracked with the greatest accuracy while it is in motion. This may be beneficial for the casino tracking system 100 to determine whether the gaming chip tag 130*a* is being moved to a specific betting location on a table, being transferred to another person (e.g., dealer or server as a tip, another player, to the cage, etc.), or is being moved to an undesired location (e.g., exiting the casino, suspicious transfer of the chip, etc.). The processing unit 132 may also be configured to increase the frequency/rate at which the gaming chip tag 130*a* transmits UWB pulses (via the UWB chip 144) when the casino tracking system 100 determines that the gaming chip tag 130*a* is in a defined zone, as described in further detail below.

The processing unit 132 is configured to perform lighting operations via the lighting module 134. For example, the gaming chip tag 130*a* may include one or more LEDs (not shown) that can be turned on/off by the lighting module 134 for certain situations. As just one example, the lighting module 134 may turn on one of the LEDs if the battery 150 has low power. As another example, the lighting module 134 may turn on one of the LEDs if the gaming chip tag 130*a* is in pairing mode.

The processing unit 132 is configured to transmit UWB signals via the UWB module 144 in communication with one or more antennae 146. As one example, using the two-way ranging (TWR) method described above, the UWB module 144 may transmit UWB signals to the plurality of anchors 120 to enable the casino tracking system 100 to determine the location of the gaming chip tag 130*a*.

Figure 6A:
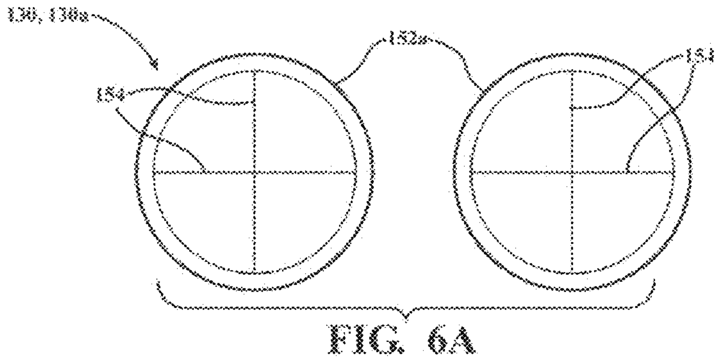
FIG. 6A is a schematic view of an exemplary gaming chip tag of the casino tracking system of FIG. 2.
Figure 6B:
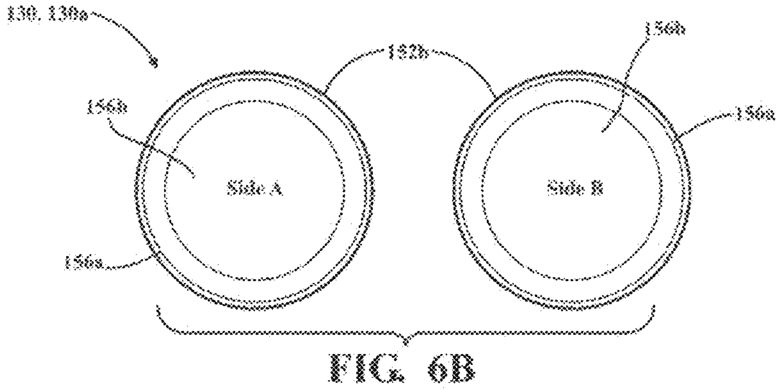
FIG. 6B is a schematic view of an exemplary gaming chip tag of the casino tracking system of FIG. 2.
Figure 6C:
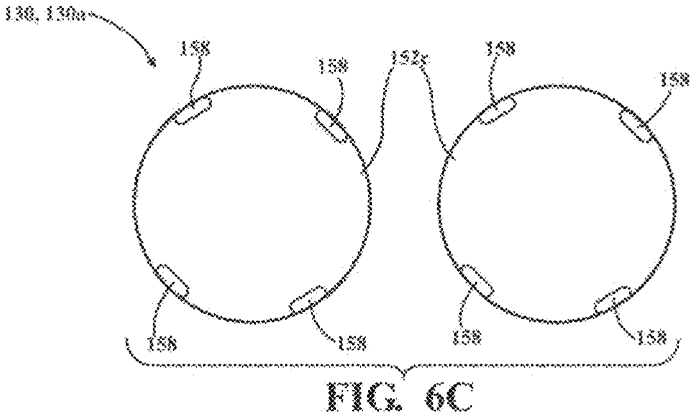
FIG. 6C is a schematic view of an exemplary gaming chip tag of the casino tracking system of FIG. 2.
Figure 7A:
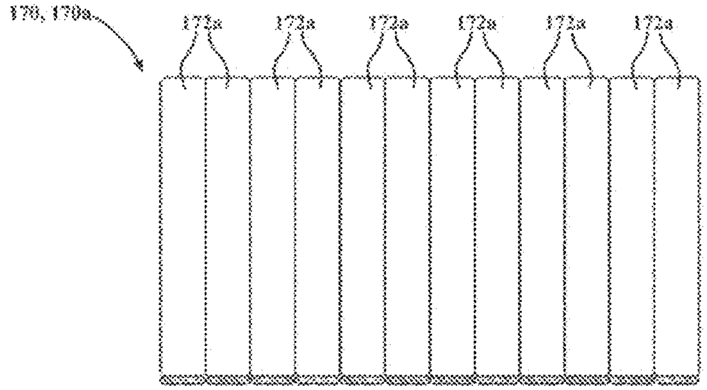
FIG. 7A is a schematic view of an exemplary gaming chip tray of the casino tracking system of FIG. 2.

Referring to FIGS. 6A-6C, the gaming chip tag 130*a* may include a variety of different features to charge the battery 150 in conjunction with the charging logic and voltage management module 148. As illustrated in FIGS. 6A and 7A, a Qi or induction charging system is generally shown with a Qi or induction charging housing 152*a* having one or more charging coils 154 on both sides of the chip. The gaming chip tags 130*a* are configured to be stacked in slots or channels 172*a* of a Qi or induction charging tray 170*a* as shown in FIG. 7A The Qi or induction charging tray 170*a* may include a slight angle at the channels 172*a* to allow the chips to naturally rest at the bottom due to gravity, where the current is supplied to the chips. The charging logic and voltage management module 148 is configured to determine when to pass the current from one chip to the next. For example, if the charging logic and voltage management module 148 of a specific gaming chip tag 130*a* determines that its battery 150 is sufficiently charged, then the charging logic and voltage management module 148 is configured to pass the current through to the next chip. If the charging logic and voltage management module 148 of the final gaming chip tag 130*a* in the channel 172*a* determines that its battery 150 is sufficiently charged, then the charging logic and voltage management module 148 is configured to ignore the current.

Figure 7B:
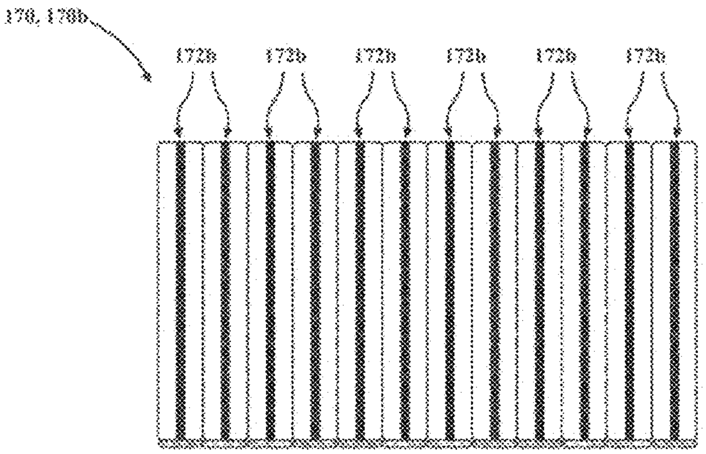
FIG. 7B is a schematic view of an exemplary gaming chip tray of the casino tracking system of FIG. 2.

Referring to FIGS. 6B and 7B, a first cradle style charging system is generally shown with a ring charging housing 152*b* having an outer peripheral ring 156*a* and an inner ring 156*b*, both of which are formed of a conductive material, such as a metal. The gaming chip tags 130*a* are configured to be stacked in slots or channels 172*b* of a first cradle charging tray 170*b* as shown in FIG. 7B. The first cradle charging tray 170*b* includes a conductive bar 174 extending along each channel 172*b* that is configured to deliver current to the gaming chip tags 130*a* through the outer ring 156*a*. Similar to the induction charging method, the charging logic and voltage management module 148 (via the inner ring 156*b*) may enable a gaming chip tag 130*a* to pass current to an adjacent gaming chip tag 130*a*.

Figure 7C:
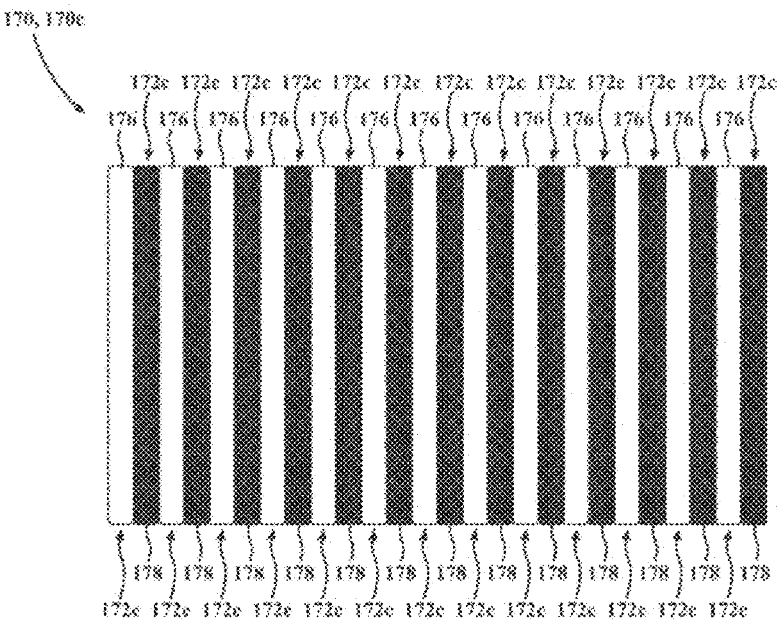
FIG. 7C is a schematic view of an exemplary gaming chip tray of the casino tracking system of FIG. 2.

Referring to FIGS. 6C and 7C, a second cradle style charging system is generally shown with a terminal charging housing 152*c* having four metal terminals 158 that slightly protrude from both sides of the chip face. The gaming chip tags 130*a* are configured to be stacked in slots or channels 172*c* of a second cradle charging tray 170*c* as shown in FIG. 7C. The second cradle charging tray 170*c* includes a positive conductive plate 176 and a negative conductive plate 178 extending along each of the channels 172*c*, and generally dividing each channel 172*c* in half In some implementations, there may be a plastic divider between the plates 176, 178 so the terminals 158 on the chip cannot bridge the gap between the positive conductive plate 176 and the negative conductive plate 178. When the gaming chip tags 130*a* are placed in the channels 172*c*, the charging logic and voltage management module 148 is configured to determine which terminal 158 is receiving a positive charge and which terminal 158 is receiving a negative charge, and the charging logic and voltage management module 148 is configured to adjust to receive the charge. In other implementations, the gaming chip tags 130*a* may include indicators (e.g., colors, markings, etc.) to align the proper terminals 158 with the proper conductive plate 176, 178.

The charging logic and voltage management module 148 may be configured to determine when it is time to charge the gaming chip tags 130*a*. For example, the charging logic and voltage management module 148 may determine that it is time to charge only when the status of a table has been set to closed. In such an example, the casino tracking system 100 may transmit a signal to the UWB module 144 of the gaming chip tag 130*a* (via the antenna 146) including instructions that the table is closed and the charging logic and voltage management module 148 should initiate the charging process. As another example, the charging logic and voltage management module 148 may determine that it is time to charge based on camera detection of a closed table, an external event, or a trigger on the chip tray indicating that the tray is closed and locked. As yet another example, the charging logic and voltage management module 148 may determine that it is time to charge based on a scheduling program for the gaming table that indicated the table will be closed for x hours, where x hours is enough time for a full charge of the gaming chip battery 150.

Referring to FIG. 5, the gaming chip tag 130*a* may include the NFC module 140. This function would allow stacks of gaming chip tags 130*a* to communicate with each other in the stack. In some implementations, the gaming chip tag 130*a* may be the only items on the table with NFC. If the casino tracking system 100 has an accurate location of a gaming chip tag 130*a*, it may request that the gaming chip tag 130*a* perform an NFC scan via the NFC module 140. The gaming chip tag 130*a* may be configured to work within a low distance range as to only scan other gaming chip tags 130*a* within 3 mm (as an example). This may prevent gaming chip tags 130*a* being detected that are adjacent to the gaming chip tag 130*a*.

With this methodology, the casino tracking system 100 may submit a request to a gaming chip tag 130*a* in a stack that is deemed to be precisely located, or the bottom gaming chip tag 130*a* in the stack, and the gaming chip tags 130*a* would then communicate with each other to determine all the gaming chip tags 130*a* in the stack. It is also possible that an anchor 120 sends a UWB signal to all gaming chip tags 130*a*, except the high confidence gaming chip tag 130*a*, in an estimated stack to perform an alternate NFC broadcast (via each of the gaming chip tags' 130*a* NFC modules 140) while pulsing regularly waiting for signals from the anchor 120. The precise gaming chip tags 130*a* will then scan for the nearby gaming chip tags 130*a*. Once a gaming chip tag 130*a* detects that its information has been read, the casino tracking system 100 will instruct the gaming chip tag 130*a*, or the gaming chip tag 130*a* will automatically, switch over to a listening device for detecting any remaining gaming chip tags 130*a*. It will then send information for the gaming chip tags 130*a* it detects, via UWB, to the anchor 120 and/or other components of the casino tracking system 100. Once all requested gaming chip tags 130*a* have been located, the processing unit 132 may deactivate the NFC module 140 until the NFC module 140 is triggered again. The metadata (including group serial numbers, value, current owner, etc.) may be communicated, by one or all the gaming chip tags 130*a* in stack, to the anchors 120 for processing.

Figure 8:
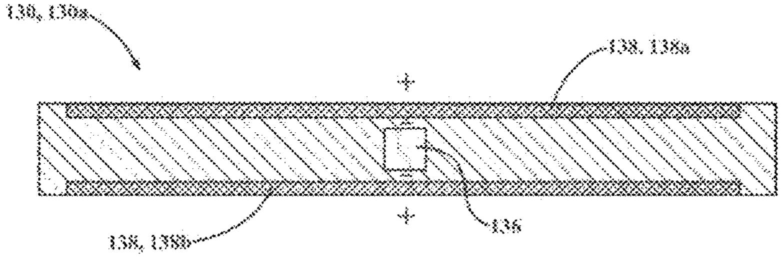
FIG. 8 is a schematic view of an exemplary gaming chip tag of the casino tracking system of FIG. 2.

Referring to FIGS. 5 and 8, the gaming chip tag 130*a* may include a magnetometer 136 in communication with a top magnet 138*a* on a top face of the housing 152 and a second magnet 138*b* on a bottom face of the housing 152. Similar to the NFC module 140 and its functionality, the magnetism created on the gaming chip tags 130*a*, may be done with the power source located in the gaming chip tag 130*a* (e.g., the battery 150). In this instance, the magnetometer 136, having the ability to determine magnetic fields from above and below the gaming chip tag 130*a*, is configured to detect changes in magnitude to determine the unique identifier of the gaming chip tag 130*a*. For instance, the casino tracking system 100 may send out requests to a gaming chip tag 130*a* to identify itself to the surrounding gaming chip tags 130*a*. The surrounding gaming chip tags 130*a* are instructed to listen for this gaming chip tag 130*a*. The casino tracking system 100 may then send magnetic pulses through the magnets 138 on the gaming chip tags 130*a*, similar to a Morse code message, to inform the other gaming chip tags 130*a* of its location.

The processing unit 132 is also configured to obtain instructions from the casino tracking system 100 for UWB pulse management (e.g., speed, time intervals, pulse methodology, etc.), obtain requests from the casino tracking system 100 to turn on/off anchor mode as described in greater detail below, determine when to send UWB pulses when dormant (e.g., in a chip tray), obtain encrypted data to store in the memory 132*b* for forensic purposes (e.g., player information, associated gaming table, etc.), implement lighting functions via the lighting module 134 (e.g., low battery indicator, locating indicator, etc.).

Figure 9:
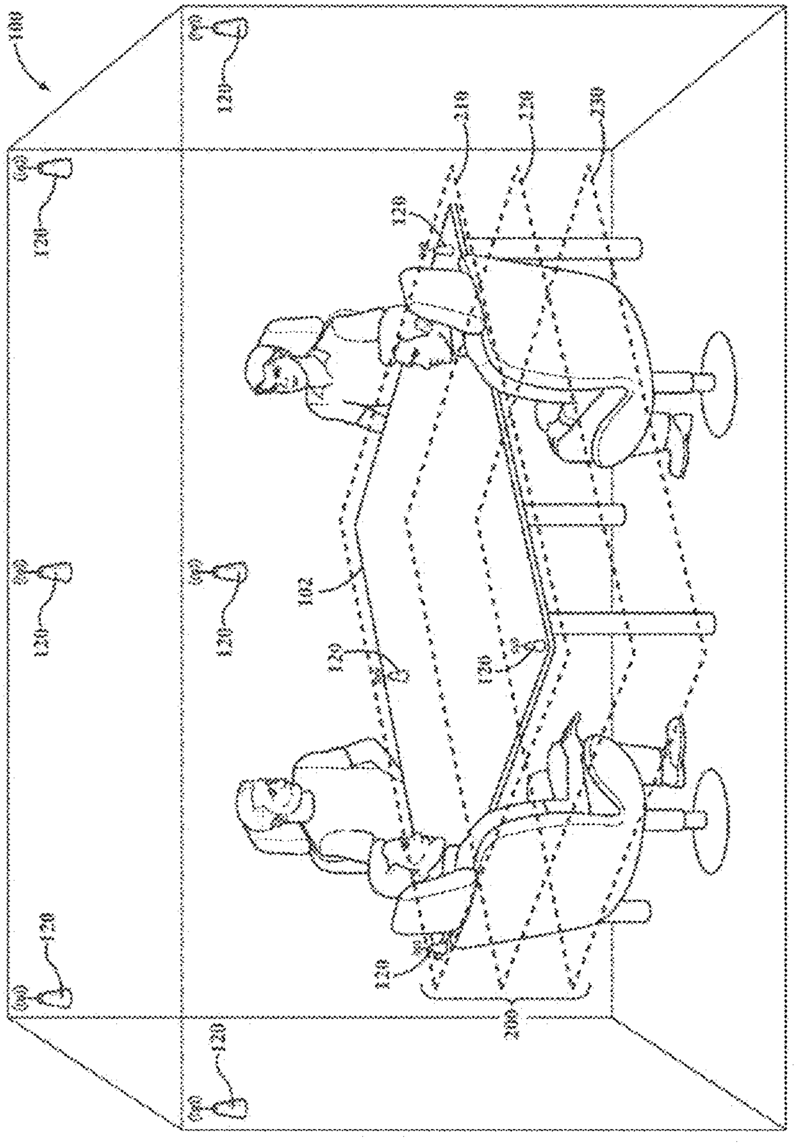
FIG. 9 is a schematic view of an exemplary table of the casino tracking system of FIG. 2.

Referring to FIG. 9, the casino tracking system 100 is configured to create one or more zones 200 based on the data from the anchors 120. For example, the zones 200 may include a tabletop zone 210, a pocket zone 220, and a floor zone 230. The tabletop zone 210 reflects the gaming tabletop 102 where tracking of wagers and other items are collected. The pocket zone 220 reflects the detection of gaming chip tags 130*a* that are off the table 102 in someone's pocket, hand, purse, bag, etc. Tracking of the gaming chip tags 130*a* in the pocket zone 220 may be helpful in determining if a player is hiding winnings from the casino. The floor zone 230 may reflect lost or dropped gaming chip tags 130*a*. If the casino tracking system 100 detects a gaming chip tag 130*a* in the floor zone 230, the dealer may be alerted in real-time (e.g., via a display at the table 102 or other suitable means) that a gaming chip tag 130*a* is on the floor. The alert to the dealer may also indicate which player the gaming chip tag 130*a* is associated with, i.e., who the owner of the gaming chip tag 130*a* is, so the dealer may return it to that player.

Each zone 200 may be defined based on a set Z coordinate (height) for each zone. The XY coordinates may correlate to the range configured in the system for the table width. The XY coordinates may differ per zone as the floor zone 230 may be much larger than the other two zones 210, 220. It is also possible that the zones 200 may have a range of Z coordinates, for example, as pocket areas in the pocket zone 220 may have in a greater height range than that of the floor zone 230. In addition, the tabletop zone 210 will need to account for chip stacks and thus the Z range for the tabletop zone 210 will likely be different from that of the other zones.

Figure 10:
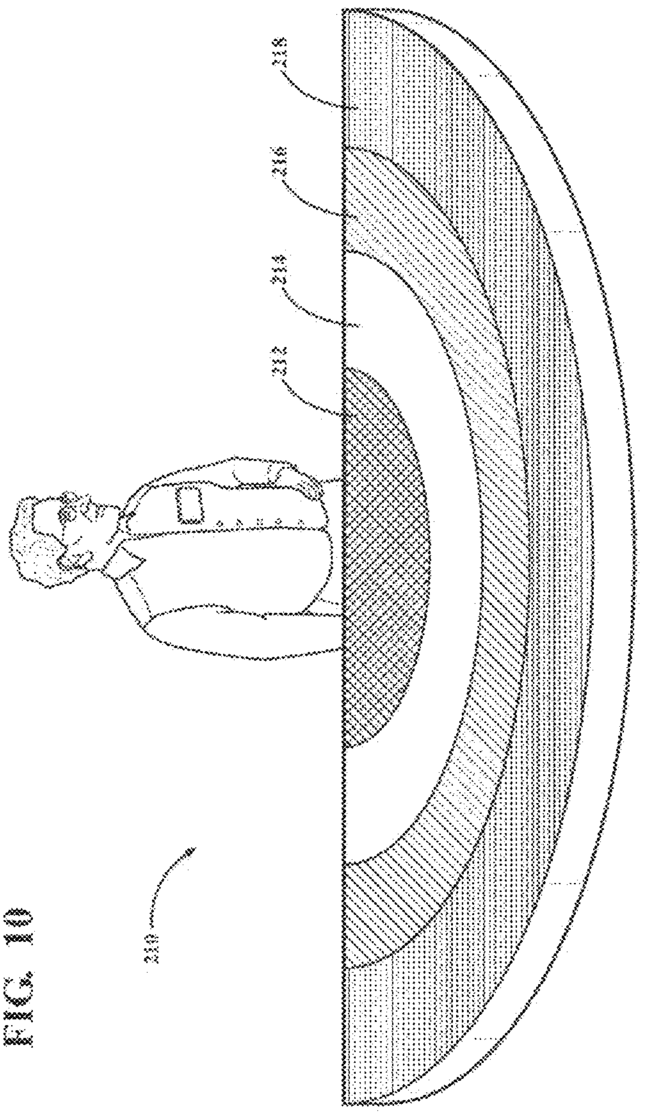
FIG. 10 is a schematic view of an exemplary table of the casino tracking system of FIG. 2.

Referring to FIG. 10, an exemplary tabletop zone 210 is generally shown. The tabletop zone 210 may include a chip tray region 212, a transaction region 214, a wagering region 216, and a player bank region 218. The chip tray region 212 is where the dealer stores the casinos chips. This area is where chips are drawn to pay out players. The transaction region 214 is where the dealer manages transactions for players. The dealer may cash a player out, change larger chips into smaller chips, process a buy-in, or color-up numerous small value chips for a lesser larger value of equal overall value. While it is a place where cards are usually played, it is also used as a temporary area for managing transactions. The wagering region 216 is where wagers and payouts are made and detected. The player bank region 218 is where the players keep their bankroll.

The transaction region 214 is important when the game is active. As bets are being placed, ancillary systems may provide information to the casino tracking system 100 indicating the start and end to a betting round. When a round begins, the wagers are locked in. Depending on the game, additional wagers may also be made. For instance, Blackjack might allow for someone to split or double down after the round has started. The casino tracking system 100 is configured to, based on the game type, determine which bets are being made, by which player, and if the associated payoff is correct.

The casino tracking system 100 may implement a variety of methods to determine payoffs. In one implementation, the casino tracking system 100 may monitor payoffs within an acceptable range. For example, if a player bets $25 on a game and there is only a 1:1 payoff option, the casino tracking system 100 would recognize a $30 payoff as outside the acceptable range, and an alert may be sent to the dealer and/or surveillance. In other implementations, card recognition technology, utilizing the camera in the ceiling and optical character recognition (OCR) or similar technology, may determine the cards on the table and determine if the payoff is accurate based on the pay table and the game rules.

With continued reference to FIG. 10, for card-based games, idle gaming chip tags **130*a* in the chip tray region 212 may be configured to UWB pulse every 3 seconds using TDOA. When a player arrives to buy-in, the player places money on the table and spreads the bills according to procedure for surveillance to see. The dealer removes the gaming chip tags 130*a* from the chip tray region 212, and places them in the transaction region 214. The gaming chip tags 130*a* in motion (as detected by the accelerometer 142 as described above) may be configured to send a UWB pulse every 10 ms to the anchors 120 using TDOA as well data that the gaming chip tags 130*a* are in motion. If needed, TWR or another method may be used, the functions of the magnetometer 136, or transmission from chip to chip using the NFC module 140** for further details or redundancy may also be utilized, as described above. It is possible the dealer uses a keypad to request a confirmation from surveillance. The dealer may have an interface that shows the amount of chips staged for the buy-in. The casino surveillance system may then determine if the amount in view matches the staged chip amount. If yes, the dealer may confirm the chip amount using a keypad and deliver the chips to the player.

If the information for this player is known at this time, via player card or other method, details will be stored on the gaming chip tags **130*a*. In-motion gaming chip tags 130*a* may be configured to continue pulsing at 10 ms until they end in the player bank region 218, and the gaming chip tags 130*a* transmit a static flag (as detected by the accelerometer 142 as described above) is transmitted in the UWB pulse message to the anchors 120**.

When a player makes a wager, the assigned gaming chip tags **130*a* in-motion may send UWB pulses every 10 ms using TDOA. If the casino tracking system 100 has a high confidence of the location for the gaming chip tags 130*a*, the casino tracking system 100 may send instructions to the gaming chip tags 130*a* to decrease their UWB frequency to every 1 second for the specific gaming chip tags 130*a*. If the casino tracking system 100 has low confidence of the location for the gaming chip tags 130*a*, the casino tracking system 100 may try reverse TDOA or request the gaming chip tags 130*a* to switch to Two Way Ranging to achieve better accuracy. If the casino tracking system 100 still has low confidence of the location for the gaming chip tags 130*a*, the casino tracking system 100 may request a high confidence gaming chip tag 130*a* near the location of the low confidence gaming chip tags 130*a*, and use Phase Difference of Arrival or any other suitable method (e.g., the functions of the magnetometer 136, or transmission from chip to chip using the NFC module 140 for further details or redundancy may also be utilized) to provide an accurate location of the low confidence gaming chip tags 130*a*. Once the gaming chip tags 130*a* locations are finalized, the casino tracking system 100 may send instructions to the gaming chip tags 130*a* to decrease their UWB frequency to every 1 second for the specific gaming chip tags 130*a***.

If the player loses, and the gaming chip tags **130*a* are in motion (10 ms pulses) and end up in the chip tray region 212, the player information is removed or marked as non-active from the gaming chip tags 130*a* and the gaming chip tags 130*a* are set as house chips. The gaming chip tags 130*a*, if remaining inactive in the chip tray region 212 may be instructed by the casino tracking system 100 to modify its pulse rate or the gaming chip tags 130*a* may automatically reduce its pulse rate after a pre-determined amount of time (e.g., 10 minutes) unless the casino tracking system 100** instructs it otherwise.

If the player wins, the casino tracking system 100 may automatically be monitoring the gaming chip tags **130*a* in motion from the chip tray region 212 due to their increased pulse rate and notice of motion. If in-motion gaming chip tags 130*a* are placed in a region beside a player wager, the casino tracking system 100 may attempt to count the gaming chip tags 130*a* being placed. If the casino tracking system 100 has a high confidence of the end location of the gaming chip tags 130*a*, the casino tracking system 100 will store the value of the gaming chip tags 130*a* as a payout and transmit player details to the gaming chip tags 130*a* based on the player who made the wagers to associate those gaming chip tags 130*a*** with that specific player.

If the casino tracking system 100 has low confidence of the end location of the gaming chip tags **130*a*, the casino tracking system 100 may attempt reverse TDOA or request the gaming chip tags 130*a* to switch to Two Way Ranging or any other suitable method (e.g., the functions of the magnetometer 136, or transmission from chip to chip using the NFC module 140 for further details or redundancy may also be utilized) to achieve better accuracy. If the casino tracking system 100 still has low confidence of the location for the gaming chip tags 130*a*, the casino tracking system 100 may request a high confidence gaming chip tag 130*a* near the location of the low confidence gaming chip tags 130*a*, and use Phase Difference of Arrival or any other suitable method (e.g., the functions of the magnetometer 136, or transmission from chip to chip using the NFC module 140 for further details or redundancy may also be utilized) to provide an accurate location of the low confidence gaming chip tags 130*a***.

Once the gaming chip tags **130*a* locations are finalized, the casino tracking system 100 may send instructions to the gaming chip tags 130*a* to decrease their UWB frequency to every 1 second for the specific gaming chip tags 130***a*. The casino tracking system 100 may then store the value of the gaming chip tags 130*a* as a payout and transmit player details to the gaming chip tags 130*a* based on the player who made the wagers.

The casino tracking system 100 understands the amount of money for each player's bank roll. In some situations, players may give other players chips. In this instance, the gaming chip tags 130*a* are still associated with the initial player wagered or cashed in. When the gaming chip tags 130*a* are transferred to another player, the casino tracking system 100 will flag that the gaming chip tag 130*a* was originally the property of a first player before given to a second player, should there be a dispute for theft and/or tax evasion.

When a player is ready to leave the table, they may want to color-up their smaller denomination chips into a larger denomination. In such scenarios, the casino tracking system 100 analyzes the gaming chip tags 130*a* as they are in motion waiting for them to be at rest. The casino tracking system 100 detects that the gaming chip tags 130*a* are at rest in the transaction region 214. The dealer may initiate a color-up process via a keypad or touchscreen at the table. The casino tracking system 100 analyzes the gaming chip tags 130*a* in the transaction region 214 accounting for the gaming chip tags 130*a* associated to the player.

If the casino tracking system 100 has a high confidence of the end location of the gaming chip tags 130*a*, it will transmit the value to be displayed on the dealer's screen and await the dealer to confirm the amount and place the corresponding amount from the chip tray region 212 beside the color-up gaming chip tags 130*a* in the transaction region 214. If the casino tracking system 100 has low confidence of the end location of the gaming chip tags 130*a*, the casino tracking system 100 may attempt reverse TDOA or request the gaming chip tags 130*a* to switch to Two Way Ranging or any other suitable method (e.g., the functions of the magnetometer 136, or transmission from chip to chip using the NFC module 140 for further details or redundancy may also be utilized) to achieve better accuracy. If the casino tracking system 100 has medium confidence of the end location of the gaming chip tags 130*a* (e.g., all gaming chip tags 130*a* are located on the table, but not all in the transaction region 214, and the amount coincides with the amount stored as the player's bankroll), the casino tracking system 100 may display the final amount and await a confirmation from the dealer.

If the casino tracking system 100 still has low confidence of the location for the gaming chip tags 130*a*, the casino tracking system 100 may request a high confidence gaming chip tag 130*a* near the location of the low confidence gaming chip tags 130*a*, and use Phase Difference of Arrival or any other suitable method (e.g., the functions of the magnetometer 136, or transmission from chip to chip using the NFC module 140 for further details or redundancy may also be utilized) to provide an accurate location of the low confidence gaming chip tags 130*a*. Once confirmed, the casino tracking system 100 may transmit the final amount for display on the dealer's screen for the dealer to confirm and place the coinciding higher denomination gaming chip tags 130*a*, matching the collective value of the player's lower denomination gaming chip tags 130*a*, from the chip tray region 212.

Once the casino tracking system 100 detects that the gaming chip tags 130*a* from the chip tray region 212 are placed in the transaction region 214, the gaming chip tags 130*a* are embedded with the players details as well as any information requested such as the table played, date, dealer, etc., indicating a transfer of ownership to the player.

If, in any instance, the casino tracking system 100 (or the dealer) indicates that there is something incorrect with the color-up process, the casino tracking system 100 may be configured to perform operations to highlight the incorrect gaming chip tags 130*a*. For example, the casino tracking system 100 may identify that one of the gaming chip tags 130*a* should not be included in the color-up (e.g., doing so would give the player more money than what he is exchanging for), the casino tracking system 100 may transmit instructions to the specific gaming chip tag 130*a* to activate a lighting indicator (via the lighting module 134) on the chip so the dealer can properly identify the improper gaming chip tag 130*a* and remove it from the transaction region 214.

When the casino tracking system 100 detects that the player's original lower denomination gaming chip tags 130*a* have been placed in the chip tray region 212, the casino tracking system 100 transmits data and instructions to the gaming chip tags 130*a* to convert their ownership back to the casino.

When a player is ready to finish gambling, they may request a cash-out. The casino tracking system 100 may utilize a ticket-in/ticket-out (TITO) printer to print a ticket allowing the player to collect cash at the cage 106 or other kiosk. The cash-out process may be similar to the color-up process previously described, with a few differences as follows.

The casino tracking system 100 analyzes the gaming chip tags 130*a* as they are in motion waiting for them to be at rest. When the casino tracking system 100 detects that the gaming chip tags 130*a* are at rest in the transaction region 214, the casino tracking system 100 (or the dealer) may initiate a cash-out procedure. The casino tracking system 100 may analyze the gaming chip tags 130*a* in the transaction region 214, accounting for the gaming chip tags 130*a* associated with the player seeking to cash out.

If the casino tracking system 100 has a high confidence of the end location of the gaming chip tags 130*a*, it may transmit the value to be displayed on the dealer's screen and await the dealer to confirm the amount. If the dealer confirms the amount, the casino tracking system 100 (or the dealer) may initiate a print operation to print a ticket for the player. If the casino tracking system 100 has low confidence of the end location of the gaming chip tags 130*a*, the casino tracking system 100 may attempt reverse TDOA or request the gaming chip tags 130*a* to switch to Two Way Ranging or any other suitable method (e.g., the functions of the magnetometer 136, or transmission from chip to chip using the NFC module 140 for further details or redundancy may also be utilized) to achieve better accuracy. If the casino tracking system 100 has medium confidence of the end location of the gaming chip tags 130*a* (e.g., all gaming chip tags 130*a* are located on the table, but not all in the transaction region 214, and the amount coincides with the amount stored as the player's bankroll), the casino tracking system 100 may display the final amount and await a confirmation from the dealer. Once the casino tracking system 100 receives a confirmation from the dealer, the casino tracking system 100 (or the dealer) may initiate a print operation to print a ticket for the player.

If the casino tracking system 100 still has low confidence of the location for the gaming chip tags 130*a*, the casino tracking system 100 may request a high confidence gaming chip tag 130*a* near the location of the low confidence gaming chip tags 130*a*, and use Phase Difference of Arrival or any other suitable method (e.g., the functions of the magnetometer 136, or transmission from chip to chip using the NFC module 140 for further details or redundancy may also be utilized) to provide an accurate location of the low confidence gaming chip tags 130*a*. The casino tracking system 100 may then transmit a final value to the dealer for confirmation. Once the casino tracking system 100 receives a confirmation from the dealer, the casino tracking system 100 (or the dealer) may initiate a print operation to print a ticket for the player.

If, in any instance, the casino tracking system 100 (or the dealer) indicates that there is something incorrect with the cash-out process, the casino tracking system 100 may be configured to perform operations to highlight the incorrect gaming chip tags 130*a*. For example, the casino tracking system 100 may identify that one of the gaming chip tags 130*a* should not be included in the cash-out (e.g., doing so would give the player more money than what he is exchanging for), the casino tracking system 100 may transmit instructions to the specific gaming chip tag 130*a* to activate a lighting indicator (via the lighting module 134) on the chip so the dealer can properly identify the improper gaming chip tag 130*a* and remove it from the transaction region 214.

When the casino tracking system 100 detects that the player's gaming chip tags 130*a* have been placed in the chip tray region 212, the casino tracking system 100 transmits data and instructions to the gaming chip tags 130*a* to convert their ownership back to the casino.

When cashing-out, a player may wish to tip the dealer using one of their gaming chip tags 130*a*. In this instance, the casino tracking system 100 may detect that the tipped gaming chip tags 130*a* have been moved from the player to the dealer, but have not been placed in the chip tray region 212, e.g., the dealer may place the gaming chip tags 130*a* in their pocket, a location adjacent the chip tray region 212, off the table, or any other suitable location. After a pre-determined amount of time in possession of the dealer, the casino tracking system 100 may automatically transmit instructions to the tipped gaming chip tags 130*a* to transfer ownership from the player to the dealer.

In all of these transactions, information is stored in the gaming chip tags 130*a* for the bet type, amount, time, player, etc., for understanding current profitability and other information requested.

Roulette may include many more wagers in a variety of locations and a smaller space. Accordingly, in some implementations, the casino tracking system 100 may include an optional mobile anchor 120*a* (see FIG. 3) that the dealer may be able to move around the table to improve accuracy. In some implementations, the mobile anchor 120*a* may be incorporated into a crown or dolly, which, in traditional roulette, is a device used to mark the number on the layout which corresponds to the number in the compartment where the roulette ball comes to rest.

As an exemplary process for a round of roulette, assume that players have bought in (as described above) and are making their initial wagers. The roulette gaming chip tags 130*a* may be configured to transmit UWB pulses every 3 seconds when the casino tracking system 100 determines that they are not in action or not in the wagering region 216. When the casino tracking system 100 determines that the roulette gaming chip tags 130*a* are in motion (e.g., via the accelerometer 142), the roulette gaming chip tags 130*a* may be configured to transmit UWB pulses every 10 ms. When the casino tracking system 100 determines that the roulette gaming chip tags 130*a* are in the wagering region 216, the roulette gaming chip tags 130*a* may be configured to transmit UWB pulses every 500 ms, awaiting instructions from the casino tracking system 100.

Once the casino tracking system 100 determines that the roulette ball (which may also be a tag 130) is in motion, the casino tracking system may transmit instructions to the roulette gaming chip tags 130*a* to transmit UWB pulses every 50 ms for roulette gaming chip tags 130*a* in the wagering region 216. Once the casino tracking system 100 determines that no more bets can be placed (e.g., via spin rate of the roulette ball, the dealer, cameras, other sensors, etc.), the casino tracking system 100 may identify any bets that included an "in-motion" flag that went from a player's bankroll region 218 to the wagering region 216 within a pre-determined amount of time (e.g., one second) from the "no more bets" notice. This may be used to flag people making late wagers and/or cheating the system.

The casino tracking system 100 will continue to track and monitor the locations of the roulette gaming chip tags 130*a* that are transmitting UWB pulses every 50 ms. When the casino tracking system 100 detects the winning number (e.g., via the calibration of the layout as described below), the casino tracking system 100 may transmit instructions to the roulette gaming chip tags 130*a* located in the winning regions, and those in surrounding regions, to transmit UWB pulses every 10 ms.

The dealer may place the UWB dolly 120*a* on the top of the winning number in the wagering region 216. The casino tracking system 100 may continue to monitor and track locations of the roulette gaming chip tags 130*a* and may go through a process of Reverse TDOA or request that a roulette gaming chip tag 130*a* switch to Two Way Ranging or any other suitable method (e.g., the functions of the magnetometer 136, or transmission from chip to chip using the NFC module 140 for further details or redundancy may also be utilized) to achieve better accuracy during this period.

The casino tracking system 100 may detect roulette gaming chip tags 130*a* that are removed from the wagering region 216, placed into the transaction region 214, and ultimately at rest in the chip tray region 212. The casino tracking system 100 then transmits instructions to these roulette gaming chip tags 130*a* in the chip tray region 212 to change ownership from the player to the casino. The dealer may "tidy up" the winning stacks for better viewing and analysis. Once completed, the dealer may indicate that the losing roulette gaming chip tags 130*a* have been removed using the keypad or touchscreen. As previously described, the casino tracking system 100 may also track the winning gaming chip tags 130*a* that have been removed from the wagering region 216 and assign ownership to the player associated with the player bankroll region 218 (or on the person themselves) the gaming chip tags 130*a* are located in for a set period of time.

The casino tracking system 100 may finish processing the roulette gaming chip tags 130*a*, utilizing the UWB dolly 120*a* as a localized anchor, in conjunction with the other nearby anchors 120, to determine the overall payouts of the roulette gaming chip tags 130*a*. The casino tracking system 100 may analyze the roulette gaming chip tags 130*a* being removed from the chip tray region 212 to ensure that the amounts are accurate and correct. If not, the casino tracking system 100 may transmit an alert to the dealer and/or transmit instructions to the incorrect roulette gaming chip tags 130*a* to turn on a lighting indicator.

In some implementations, the tabletop zone 210 may include a cradle or a designated region for the UWB dolly 120*a*, such that, when the casino tracking system 100 detects that the UWB dolly 120*a* is in the cradle or designated region, the casino tracking system 100 understands that the current round is over and a new round is ready. Conversely, in the absence of a trigger event from an ancillary system, the casino tracking system 100 may recognize that the removal of the UWB dolly 120*a* and placement on a number may indicate a round is in a payout state and begin calculating the payouts.

Figure 11:
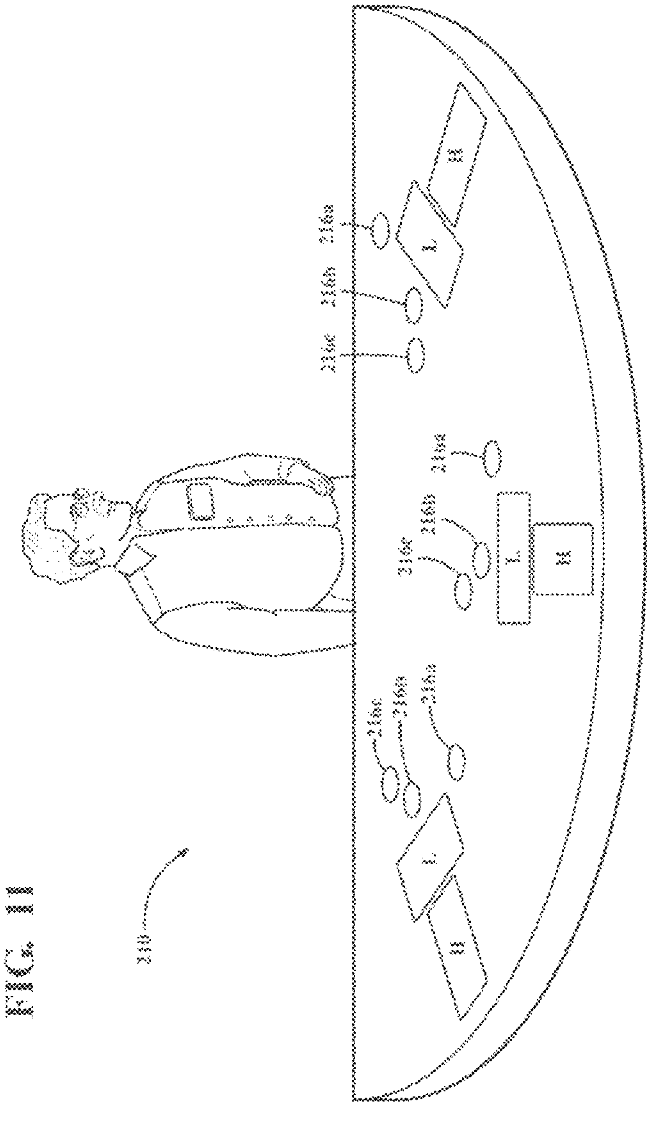
FIG. 11 is a schematic view of an exemplary table of the casino tracking system of FIG. 2.

Referring to FIG. 11, the wagering region 216 may include sub-regions 216*a-c* for specific wagers. FIG. 11 illustrates an exemplary Fortune Pai Gow Table, which will be described for illustrative purposes; however, it should be understood that all teachings herein may equally apply to other casino games, including Roulette, Craps, Baccarat, etc.

Layout proofs are images of the layouts on the gaming table. They are used by casinos to approve the artwork and verbiage on the table. They are to-scale for what will actually be put on the gaming table. The casino tracking system 100 may use these layout proofs and sub-regions 216*a-c* to calibrate the tracking of the gaming chip tags 130*a*.

For example, the layout proof may be imported into the casino tracking system 100. The casino tracking system 100 may calibrate the layout proof for the sub-regions 216*a-c* by selecting the sub-regions 216*a-c* and defining them. For example, if this layout is imported as a Pai Gow layout, the casino tracking system 100 may be programmed to understand this specific game and its layout, such as, the game has a Fortune bonus and a Progressive Bonus.

The casino tracking system 100 may ask a user to click on the ante bet, and in response to the user identifying the ante bet, the casino tracking system 100 may determine which other patterns match and work on a left to right or right to left angle to define the corresponding ante bet positions. The process is then repeated for the remaining betting sub-regions 216*a-c*.

The casino tracking system 100 may apply logic based on the curvature of the table to determine the other regions such as the cash out/color up region, the player bankroll area, and the chip tray. The chip tray is automatically detected due to the gaming chip tags 130*a* in it.

Once the layout is input into the casino tracking system 100, it is an option to be selected by the staff putting the layout on the table. This can be done via an input screen someone on or near the table. It is also possible, that the overhead camera automatically detects the new layout on the table using a matching algorithm.

Start of the calibration process will require that two or more gaming chip tags 130*a* or other calibration tags 130 are placed in designated areas on the layout. This may be shown in a UI of the layout or simply explained via instructions. There may also be dedicated chip positions that are not betting positions where the gaming chip tags 130*a* or other calibration tags 130 are placed. Once the gaming chip tags 130*a* are placed, the user confirms that the gaming chip tags 130*a* are in the proper location.

The casino tracking system 100 may then determine distances between the gaming chip tags 130*a* and associated to the scaled proof Using the ratio of where the casino tracking system 100 expects gaming chip tags 130*a*, it may create a model of the gaming table and all the betting sub-regions 216*a-c*. If further sub-regions are required, the casino tracking system 100 may instruct the user to place other gaming chip tags 130*a* in the desired locations.

As previously discussed, the casino tracking system 100 may also utilize a gaming chip tag 130*a* as an anchor 120 to determine what other gaming chip tags 130*a* are closest to it. As mentioned, the gaming chip tags 130*a* may include a magnetometer 136, which is configured to detect the presence of magnetic fields. The magnetic field may not be strong enough to allow the gaming chip tags 130*a* to stick together. The magnetic field may be just strong enough to be detected by the magnetometer 136.

The magnetometer 136 may zero out the magnetic pull from the installed magnets 138. The magnetometer 136 may detect magnetic values in an XYZ plane. For example, a first gaming chip tag 130*a* may detect if a second gaming chip tag 130*a* is on top of it due to the magnetic field created by the second gaming chip tag 130*a*. The magnetometer 136 of the second gaming chip tag 130*a* may likewise detect the magnetic field of the first gaming chip tag 130*a* below it. If a third gaming chip tag 130*a* is added to the stack, the magnetometer 136 of the second gaming chip tag 130*a* may detect a magnetic field on the top and bottom of the second gaming chip tag 130*a*.

In situations where there are many gaming chip tags 130*a*, or where the casino tracking system 100 may have low confidence determining exact locations of the gaming chip tags 130*a*, the casino tracking system 100 may utilize the stacked nature of the gaming chip tags 130*a* and their recognition of whether an adjacent gaming chip tag 130*a* is above or below it to improve location tracking accuracy.

For example, the casino tracking system 100 may obtain data from all the gaming chip tags 130*a* in the desired region (e.g., the wagering region 216) indicating whether each gaming chip tag 130*a* is an open chip (i.e., not part of a stack of gaming chip tags 130*a*), an end chip (i.e., either top or bottom of a stack of gaming chip tags 130*a*), or a middle chip (i.e., there are gaming chip tags 130*a* above and below the gaming chip tag 130*a*). The casino tracking system 100 may instruct the end gaming chip tags 130*a* to activate as anchors (via the UWB module 144 and the one or more antennas 146). The casino tracking system 100 may also transmit instructions to the middle gaming chip tags 130*a* to increase their frequency, or change a setting to differentiate the signal coming from the middle gaming chip tags 130*a*, for a quicker determination of location. It is also possible that these middle gaming chip tags 130*a* use a Phase Difference of Arrival approach or Two Way Ranging to determine location at a more rapid rate since the space for analysis is smaller.

In a card-based game, this additional logic may be used to confirm the location of particular gaming chip tags 130*a*. For example, if there is a main wager with three gaming chip tags 130*a*, a side wager with one gaming chip tags 130*a*, and a gaming chip tag 130*a* in the main wager is showing a lower location accuracy than a pre-determined threshold allowed by the casino tracking system 100. In this scenario, the casino tracking system 100 may request an open/end/middle analysis for the designated gaming chip tags 130*a*. Once the casino tracking system 100 receives the open/end/middle status from the gaming chip tags 130*a*, the casino tracking system 100 will then understand which gaming chip tags 130*a* are in the main wager and which are in the side wager based on whether the gaming chip tags 130*a* are an open, end, or middle gaming chip tag 130*a*.

This type of analysis may be beneficial in a game like roulette where large stacks of gaming chip tags 130*a* needs to be accurate in determining the stack height and location.

The casino tracking system 100 may, for added granularity, change over all end gaming chip tags 130*a* to become anchors. This may allow for a much more focused area (i.e., chips in stacks) to analyze pulses for location information.

The information provided to the casino tracking system 100 may be analyzed and factored in with the static anchors 120 for location information.

It may also be possible that the casino tracking system 100 seeks out the end gaming chip tags 130*a* when a triggering event occurs, such as, the number is established in roulette. Therefore, when the casino tracking system 100 detects that the roulette ball has landed in the winning number, the casino tracking system 100 may conduct an open/end/middle analysis for those gaming chip tags 130*a* in the desired region. The casino tracking system 100 may further utilize the UWB dolly 120*a* as an anchor, or possibly only as a tag, to further enhance the location of the gaming chip tags 130*a* in the reg 10*n*.

It may also be possible that only the largest stack or the main number stack of gaming chip tags 130*a* that has the UWB dolly 120*a* on top of it is used as the anchor. In short, the casino tracking system 100 may be adapted to provide additional anchors as needed for maximum accuracy.

The placement of the magnets 138 on the top and bottom of the gaming chip tags 130*a* may provide a better broadcast signal for the pulse as it does not penetrate up and down, rather it reflects off the magnets 138 and broadcasts out from the edges of the gaming chip tags 130*a* providing a better centralized location for anchors 120.

In other implementations, when the casino tracking system 100 determines that a gaming chip tag 130*a* is at rest (e.g., via the accelerometer 142), the casino tracking system 100 may automatically instruct the at-rest gaming chip tag 130*a* to switch to anchor mode and/or the processing unit 132 may be programmed to automatically switch to anchor mode. Because the gaming chip tag 130*a* is not moving, and the casino tracking system 100 knows its last location, the at-rest gaming chip tag 130*a* can effectively function as an anchor. In situations where there are many gaming chip tags 130*a* at rest that are functioning as anchors, the casino tracking system 100 may create a mesh tracking system, whereby the tags 130 toggle between anchor mode when at rest and tag mode when in motion. Such a system may improve tracking accuracy throughout the casino.

The casino tracking system 100 may include the following additional features.

When a player leaves the table after coloring up, the gaming chip tags 130*a* are embedded with their details. When the player arrives at a different table to play, the casino tracking system 100 detects the player's arrival when the player receives change, e.g., from the chip tray region 212. The casino tracking system 100 may automatically start the player's rating and add them to the table.

Dealer tipping may require gaming chip tag 130*a* tips to be placed in a toke box and collected after a certain period of time. This usually occurs daily. In this embodiment, there may be a tray or holder for dealer tips. The tip may need to originate from a player who was recently playing and could not have been flagged as lost at any point recently. The tokes may be collected in a small bin. The casino tracking system 100 may change the status of the gaming chip tags 130*a* from the player to the toke designator. After a defined period (e.g., five minutes), the dealer may take the tokes out of the holder and put them back into the chip tray region 212 where the casino tracking system 100 may now identify these gaming chip tags 130*a* as house chips. The record of the toke is digitally recorded.

Similar to the dealer toke, gaming chip tag 130*a* tips received by cocktail servers may utilize the same logic. Upon detection of a server receiving a tip, the casino tracking system 100 may change the owner to the server with information still embedded with the player. After the casino tracking system 100 detects that the tip has spent time in the server's proximity (e.g., on the server's tray, in their pocket, etc.) for a defined period of time, the server may return the gaming chip tags 130*a* back to the table, and the casino tracking system 100 may record the tip and associate it with the server's account. The chips may then be placed into the chip tray region 212 where the casino tracking system 100 may now identify these gaming chip tags 130*a* as house chips.

In some implementations, the memory 132*b* of the processing unit 132 of each gaming chip tag 130*a* may store transactional data, such as, tips, players, etc., that may be used forensically.

Dealers may tap in when they arrive at the table. The active dealer may need to complete their active round before tapping out. The casino tracking system 100 may utilize the dealer tag 130*b* to determine if the dealer is arriving late regularly. In addition, the dealers could utilize their dealer tags 130*b* to clock in at the table for their shift as a means of authentication.

Figure 12:
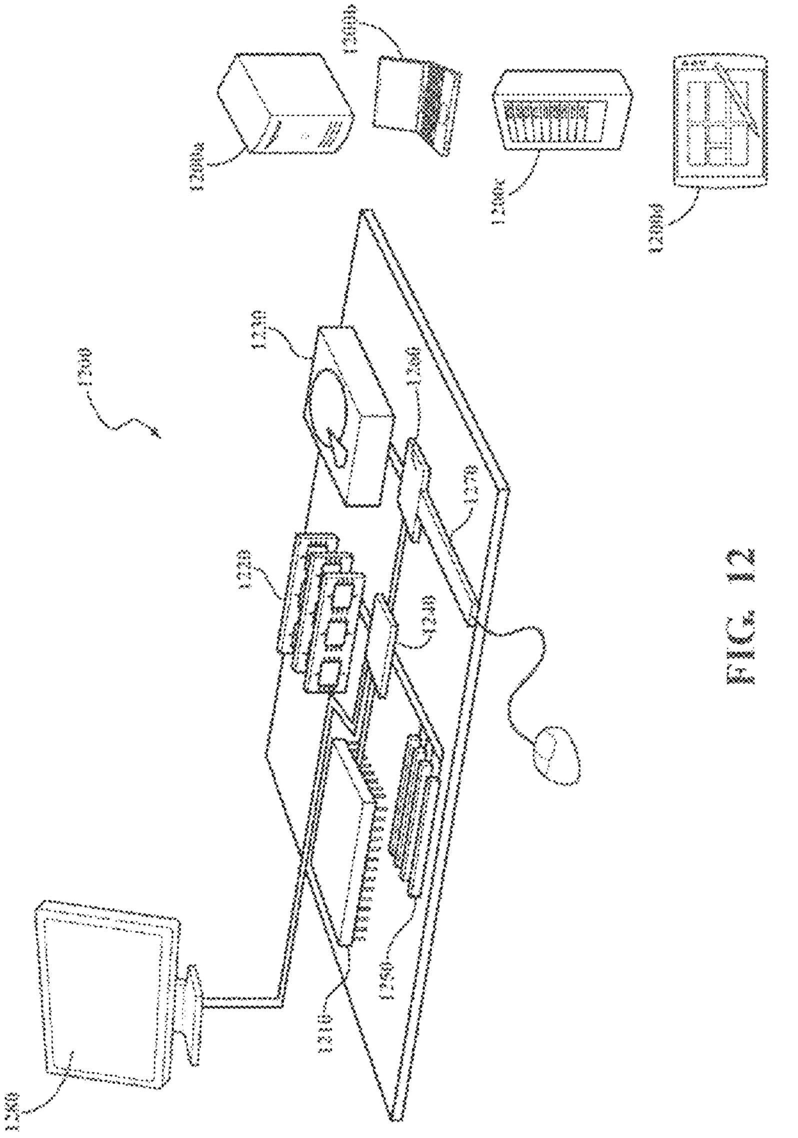
FIG. 12 is a schematic view of an example computing device that may be used to implement the systems and methods described herein.

FIG. 12 is a schematic view of an example computing device 1200 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1200 includes a processor 1210, memory 1220, a storage device 1230, a high-speed interface/controller 1240 connecting to the memory 1220 and high-speed expansion ports 1250, and a low speed interface/controller 1260 connecting to a low speed bus 1270 and a storage device 1230. Each of the components 1210, 1220, 1230, 1240, 1250, and 1260, are interconnected using various busses, and may be mounted on a common motherboard or in other manners as appropriate. The processor 1210 can process instructions for execution within the computing device 1200, including instructions stored in the memory 1220 or on the storage device 1230 to display graphical information for a graphical user interface (GUI) on an external input/output device, such as display 1280 coupled to high speed interface 1240. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1230 is capable of providing mass storage for the computing device 1200. In some implementations, the storage device 1230 is a computer-readable medium. In various different implementations, the storage device 1230 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1220, the storage device 1230, or memory on processor 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and a low-speed expansion port 1290. The low-speed expansion port 1290, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1200*a* or multiple times in a group of such servers 1200*a*, as a laptop computer 1200*b*, as part of a rack server system 1200*c*, or as a tablet computer 1200*d*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A tracking system for tracking gaming chips in a casino, the tracking system comprising data processing hardware to determine a value of the gaming chips, wherein each of the gaming chips comprise a communication module configured to allow the gaming chips to communicate with each other using one or more ultra-wideband signals, and wherein when the gaming chips are arranged in a stack on a gaming table in the casino, one of the gaming chips located in the stack is configured to i) receive ultra-wideband signals transmitted by a plurality of other gaming chips in the stack; ii) detect the plurality of other gaming chips in the stack based on the received ultra-wideband signals; and iii) transmit information about the plurality of other gaming chips to the tracking system based on the received ultra-wideband signals.

2. The tracking system according to claim 1, wherein after the information about the one or more other gaming chips in the stack is sent to the tracking system, a second gaming chip located in the stack in a region below the top gaming chip is configured to receive ultra-wideband signals from other gaming chips in the stack to detect the other gaming chips.

3. The tracking system according to claim 2, wherein the second gaming chip is configured to send information about a plurality of other gaming chips detected in the stack to the tracking system.

4. The tracking system according to claim 1, wherein some or all of the gaming chips comprise one or more devices for the tracking system to determine if one or more of the gaming chips are at rest or in motion.

5. The tracking systema according to claim 4, wherein the one or more gaming chips that are at rest are configured to function as an anchor to receive ultra-wideband signals from one or more gaming chips, determine information about the one or more gaming chips, and transmit information to the tracking system using ultra-wideband signals about any gaming chips that are in motion.

6. The tracking systema according to claim 5, wherein the one or more devices include an accelerometer.

7. The tracking system according to claim 1, wherein when the gaming chips are arranged in a stack on a gaming table in the casino, a top gaming chip located on top of the stack is configured to receive ultra-wideband signals from a plurality of other gaming chips and detect the plurality of other gaming chips.

8. The tracking system according to claim 7, wherein the top gaming chip is configured to function as an anchor to receive ultra-wideband signals from the other gaming chips, determine information about the other gaming chips based on the received ultra-wideband signals, and transmit and receive one or more ultra-wideband signals, and at least some of the other gaming chips in the stack are configured to function as a tag to transmit and receive one or more ultra-wideband signals from other gaming chips in the stack.

9. The tracking system according to claim 7, wherein after information about the top gaming chip is transmitted to the tracking system, the top gaming chip is configured to function as an anchor to receive ultra-wideband signals from the other gaming chips, determine information about the other gaming chips, and transmit and receive one or more of the ultra-wideband signals, and at least some of the other gaming chips in the stack are configured to function as a tag to transmit and receive the one or more ultra-wideband signals.

10. The tracking system according to claim 9, wherein a second gaming chip located in the stack in a region below the top gaming chip is configured to function as an anchor to obtain information about other gaming chips in the stack.

11. The tracking system according to claim 10, wherein the other gaming chips in the stack below the second gaming chip are configured to transmit different ultra-wideband signals than signals transmitted by the second gaming chip.

12. A tracking system for tracking gaming chips in a casino using ultra-wideband signals, the tracking system comprising data processing hardware to determine a value and/or location of the gaming chips, wherein at least some of the gaming chips comprise a communication module to allow the gaming chips to communicate with each other using one or more of the ultra-wideband signals and with the data processing hardware to determine the value and/or the location of the gaming chips, and wherein the communication module of at least one of the gaming chips is configured to selectively operate as a tag or as an anchor based on a relative position of the gaming chip with respect to other gaming chips such that the gaming chip, when operating as the anchor, is configured to receive ultra-wideband signals from a plurality of other gaming chips and determine information about the plurality of other gaming chips based on the received ultra-wideband signals.

13. The tracking system according to claim 12, wherein when the gaming chips are arranged in a stack, a top gaming chip located at an end of the stack is configured to function as an anchor and to receive ultra-wideband signals from a plurality of other gaming chips in the stack and determine information about the plurality of other gaming chips, and wherein other gaming chips below the top gaming chip are configured to function as tags.

14. The tracking system according to claim 13, wherein a second gaming chip located below the top gaming chip is configured to operate as a tag when the top gaming chip is operating as the anchor and to subsequently operate as the anchor after the top gaming chip transmits information to the tracking system.

15. The tracking system according to claim 13, wherein a gaming chip that is not arranged in the stack is configured to operate as an anchor and to receive ultra-wideband signals from one or more gaming chips arranged in the stack and determine information based on the received ultra-wideband signals about the one or more gaming chips.

16. The tracking system according to claim 12, wherein when the gaming chips are arranged in the stack, an end gaming chip is configured to function as an anchor and to receive ultra-wideband signals from a plurality of other gaming chips in the stack and determine information about the plurality of other gaming chips, and wherein the other gaming chips in the stack are configured to operate as tags.

17. The tracking system according to claim 12, wherein the value and/or location of at least one of the gaming chips is determined using at least one of the following methods: time different of arrival (TDOA), reverse TDOA, two-way ranging (TWR), and phase difference of arrival (PDOA).

18. The tracking system according to claim 12, wherein the communication module is configured to determine a relative position of the gaming chip within the stack and to select operation as the anchor or the tag based on the relative position.

19. The tracking system according to claim 12, wherein the anchor is configured to receive ultra-wideband signals from a plurality of gaming chips and relay information derived from the received signals to the tracking system.

* * * * *